(12) United States Patent
Hara et al.

(10) Patent No.: US 8,060,159 B2
(45) Date of Patent: Nov. 15, 2011

(54) SLIDABLY AND ROTATIONALLY ATTACHING UNIT AND ELECTRONIC DEVICE

(75) Inventors: Yoshinori Hara, Ota (JP); Hisamitsu Takagi, Kawasaki (JP)

(73) Assignees: Yamamoto Precision Co., Ltd., Tokyo (JP); Fujitsu Limited, Kawasaki (JP)

( * ) Notice: Subject to any disclaimer, the term of this patent is extended or adjusted under 35 U.S.C. 154(b) by 828 days.

(21) Appl. No.: 12/135,495

(22) Filed: Jun. 9, 2008

(65) Prior Publication Data
US 2009/0005128 A1 Jan. 1, 2009

Related U.S. Application Data (60) Provisional application No. 61/041,417, filed on Apr. 1, 2008.

(51) Int. Cl.
*H04M 1/00* (2006.01)
(52) U.S. Cl. .................. 455/575.3; 455/575.1; 455/566; 455/575.4
(58) Field of Classification Search ............... 455/575.1, 455/575.3, 575.4, 556, 556.1, 550, 550.1, 455/566, 90, 95; 379/368, 433.06, 433.07; 341/22–26; 715/830, 784, 829, 810; 345/156–172
See application file for complete search history.

(56) References Cited

U.S. PATENT DOCUMENTS

2006/0211460 A1* 9/2006 Jeong et al. ................. 455/575.4
2008/0146296 A1* 6/2008 Sakashita et al. ........... 455/575.3
2009/0273890 A1* 11/2009 Takagi et al. ............ 361/679.01

FOREIGN PATENT DOCUMENTS
JP 08-063259 A 3/1996
* cited by examiner

*Primary Examiner* — Patrick Edouard
*Assistant Examiner* — Michael Irace
(74) *Attorney, Agent, or Firm* — Westerman, Hattori, Daniels & Adrian, LLP (57) ABSTRACT

A slidable and rotationally attaching unit configured to slidably and rotatably attach a movable housing on a supporting base so that a part of the movable housing is overlapped with the supporting base, the slidable and rotational attaching unit includes a base plate provided between the supporting base and the movable housing and attached to the supporting base; a plate cam provided between the supporting base and the movable housing and attached to the movable housing; a slide guide provided on a surface of the base plate facing the plate cam, the slide guide being formed by a slit or a groove along upper and lower directions in a standard pose that is a basic using state of the movable housing; a guide pin provided on a surface of the base plate facing the plate cam, the guide pin being positioned on an extended line of a lower end of the slide guide; and a connecting pin slidably and rotatably engaged with the plate cam so that the connecting pin prevents the plate cam from coming off from the slide guide.

13 Claims, 9 Drawing Sheets

SLIDABLY AND ROTATIONALLY ATTACHING UNIT AND ELECTRONIC DEVICE

BACKGROUND OF THE INVENTION

1. Field of the Invention

The present invention generally relates to slidably and rotationally attaching units and electronic devices, and more specifically, to a slidably and rotationally attaching unit so that a movable housing is slidably and rotatably attached to a supporting base whereby a part of the movable housing overlaps with the supporting base, and an electronic device using the slidably and rotationally attaching unit.

2. Description of the Related Art

In electronic devices such as a mobile phone, an electronic organizer, or a personal computer, a thin type display housing having a display part has a configuration where the shorter side is at the top (for example, the mobile phone) or a configuration where the longer side is at the top (for example, a notebook personal computer). Accordingly, if the display housing is fixed with its shorter side at the top or with its longer side at the top, there is inconvenience when an operator sees a display screen or performs an input operation while seeing the display screen. In other words, at the time when the operator performs the input operation such as forming documents or tables and the operator sees the result of the input operation and an image on the display screen, depending on kinds of the input operations or display subjects, there is a case where a screen having a configuration where the shorter side is at the top is suitable or a case where a screen having a configuration where the longer side is at the top is suitable.

Accordingly, in the above-mentioned electronic device, the display housing is movable and may be rotated 90 degrees if necessary so that the display housing can be converted from having its shorter side at the top to having its longer side is at the top, and vice versa.

In the above-mentioned electronic device, a supporting base is rotatably provided at an end part of a base housing having an input part by a hinge. Alternatively, a desktop supporting base is provided separately from the input part or a personal computer main body. A part of the movable housing which is an input part is provided at the supporting base so as to be overlapped with the supporting base via a slidably and rotational attaching unit.

The following structure, for example, has been suggested as the attaching unit in Japanese Laid-Open Patent Application Publication No. 8-63259. That is, an information device having a supporting base, a base plate provided at one side of a facing surface of a movable housing, and a movable plate provided at another side of the facing surface, is provided. A first guide groove and a second guide groove are formed in the base plate. The first guide groove is formed along upper and lower directions in a standard pose that is a basic use state (using state of a basic mode) of the movable housing. The second guide groove is formed along a horizontal direction under the first guide groove or curved slightly upward in a convex manner. A first projection guided to the first guide groove and a second projection guided to the second guide groove are formed in the movable plate. The first projection and the second projection are slidably guided to the corresponding guide grooves in a coming-off prevention state.

According to the above-mentioned electronic device, for example, when the second projection is situated at a left end part of the second guide groove and the movable housing is in a standard pose, namely a state where the movable housing is set with its longer side at the top, the second projection moves on the right along the second guide groove and the first projection moves upward along the first guide groove, by moving a left end lower part of the movable housing on the right. When the second projection reaches the middle point of the second guide groove, the movable housing is in a 45 degrees inclination pose in the middle position and the first projection reaches a maximum level.

After that, when the pose of the movable housing is changed so that the second projection further moves along the second guide groove in the right direction, the pose of the movable housing gradually changes so that the movable housing stands and the shorter side of the movable housing is at the top. When the second projection reaches the right end part of the second guide, the movable housing completely stands with the shorter side of the movable housing at the top.

The electronic device has switches configured to switch a display mode of the display part of the movable housing corresponding to poses of the movable housing at the same time when change of the pose of the movable housing is completed from the shorter side being at the top to the longer side being at the top, and vice versa.

The slidable and rotational attaching unit of the electronic housing has a curved configuration where the second guide groove is in a horizontal direction or bent in a mountain manner. Accordingly, the rotational operations of the movable housing are not smooth and the movable housing can be rotated 90 degrees in only a single direction.

For example, in folding type mobile phones and others, a rotational operation of the movable housing having the display part is done by the thumb of a hand of an operator while a base housing having a microphone part is held by the hand. However, the dominant hand differs by person. Hence, although it is preferable that the movable housing can be rotated in both right and left directions, it is not possible to make such a design in the conventional attaching unit.

In addition, if the movable housing can be rotated in only a single direction, the rotational direction should be indicated in a proper portion. If the rotational operation is done in a reverse direction in error, malfunction of or damage to the attaching unit may be generated.

Thus, the present invention seeks improvements such as smooth operation and degree of freedom in the design of the movable housing of the slidable and rotational attaching unit.

SUMMARY OF THE INVENTION

Accordingly, embodiments of the present invention may provide a novel and useful slidably and rotationally attaching unit and electronic device solving one or more of the problems discussed above.

More specifically, the embodiments of the present invention may provide a slidably and rotationally attaching unit whereby a movable housing can be smoothly rotated and can be rotated in both forward and reverse directions and an electronic device using the slidably and rotationally attaching unit.

One aspect of the present invention may be to provide a first slidable and rotationally attaching unit configured to slidably and rotatably attach a movable housing on a supporting base so that a part of the movable housing is overlapped with the supporting base, the slidable and rotational attaching unit including a base plate provided between the supporting base and the movable housing and attached to the supporting base; a plate cam provided between the supporting base and the movable housing and attached to the movable housing; a slide guide provided on a surface of the base plate facing the plate cam, the slide guide being formed by a slit or a groove along upper and lower directions in a standard pose that is a basic using state of the movable housing; a guide pin provided on a surface of the base plate facing the plate cam, the guide pin being positioned on an extended line of a lower end of the slide guide; and a connecting pin slidably and rotatably engaged with the plate cam so that the connecting pin prevents the plate cam from coming off from the slide guide; wherein a first concave part, a second concave part, and a third concave part are provided at an external circumference of the plate cam; the guide pin is guided to the first concave part when the movable housing is in the standard pose; the guide pin is guided to the second concave part when the movable housing is rotated 90 degrees in one direction from the standard pose; and the guide pin is guided to the third concave part when the movable housing is rotated 90 degrees in another direction from the standard pose.

Another aspect of the present invention may be to provide a second slidable and rotationally attaching unit configured to slidably and rotatably attach a movable housing on a supporting base so that a part of the movable housing is overlapped with the supporting base, the slidable and rotational attaching unit including: a base plate provided between the supporting base and the movable housing and attached to the movable housing; a plate cam provided between the supporting base and the movable housing and attached to the supporting base; a slide guide provided on a surface of the base plate facing the plate cam, the slide guide being formed by a slit or a groove along upper and lower directions in a standard pose that is a basic using state of the movable housing; a guide pin provided on a surface of the base plate facing the plate cam, the guide pin being positioned on an extended line of a lower end of the slide guide; and a connecting pin slidably and rotatably engaged with the plate cam so that the connecting pin prevents the plate cam coming off from the slide guide; an urging member configured to always urge the plate cam or the base plate in a direction where the guide pin is guided to one of the concave parts of the plate cam; wherein a first concave part, a second concave part, and a third concave part are provided at an external circumference of the plate cam; the guide pin is guided to the first concave part when the movable housing in the standard pose; the guide pin is guided to the second concave part when the movable housing is rotated 90 degrees in one direction from the standard pose; and the guide pin is guided to the third concave part when the movable housing is rotated 90 degrees in another direction from the standard pose.

Other aspect of the present invention may be to provide a third slidable and rotationally attaching unit configured to slidably and rotatably attach a movable housing on a supporting base so that a part of the movable housing is overlapped with the supporting base, the slidable and rotational attaching unit including a base plate provided between the supporting base and the movable housing and attached to the supporting base; a plate cam provided between the supporting base and the movable housing and attached to the movable housing; a slide guide provided on a surface of the base plate facing the plate cam, the slide guide being formed by a slit or a groove along upper and lower directions in a standard pose that is a basic using state of the movable housing; a projection path provided on the surface of the base plate facing the plate cam, the projection path being formed by a slit or a groove; a connecting pin provided on a surface of the plate cam facing the base plate, the connecting pin being slidably and rotatably engaged with the plate cam so that the connecting pin prevents the plate cam coming off from the slide guide; and a first projection and a second projection provided on a surface of the plate cam facing the base plate, the first projection being positioned at one side of a lower part of the connecting pin in the standard pose of the movable housing, the second projection being positioned at another side of a lower part of the connecting pin in the standard pose of the movable housing; wherein the projection path includes a first path part, a second path part, and a third path part; the first path part extends at one side of the slide guide in upper and lower directions and the first projection passes through the first path part; the second path part extends at another side of the slide guide in upper and lower directions and the second projection passes through the second path part; the lower end of the first path part and the lower end of the second path part communicate so as to form a common path part where the first projection and the second projection pass; an engaging convex part where the first projection is engaged is formed at the lower end of the first path part and another engaging convex part where the second projection is engaged is formed at the lower end of the second path part; the engaging convex parts face a center line in the width direction of the slide guide in the standard pose of the movable housing; a first engaging concave part is formed at an upper end part of the first path part and the first projection is guided to the first engaging concave part when the movable housing is rotated 90 degrees in one direction from the standard pose; a second engaging concave part is formed at an upper end part of the second path part and the second projection is guided to the second engaging concave part when the movable housing is rotated 90 degrees in another direction from the standard pose; a third engaging concave part is formed at a lower part of an end part of a side of the common path part communicating with the first path part and the second projection is guided to the third engaging concave part when the movable housing is rotated 90 degrees in the one direction from the standard pose of the movable housing; and a fourth engaging concave part is formed at a lower part of an end part of a side of the common path part communicating with the second path part and the first projection is guided to the fourth engaging concave part when the movable housing is rotated 90 degrees in the other direction from the standard pose of the movable housing.

Other aspect of the present invention may be to provide a fourth slidable and rotationally attaching unit configured to slidably and rotatably attach a movable housing on a supporting base so that a part of the movable housing is overlapped with the supporting base, the slidable and rotational attaching unit including a base plate provided between the supporting base and the movable housing and attached to the movable housing; a plate cam provided between the supporting base and the movable housing and attached to the supporting base; a slide guide provided on a surface of the base plate facing the plate cam, the slide guide being formed by a slit or a groove along upper and lower direction in a standard pose that is a basic using state of the movable housing; a projection path provided on the surface of the base plate facing the plate cam, the projection path being formed by a slit or a groove; a connecting pin provided on a surface of the plate cam facing the base plate, the connecting pin being slidably and rotatably engaged with the plate cam so that the connecting pin prevents the plate cam coming off from the slide guide; and a first projection and a second projection provided on a surface of the plate cam facing the base plate, the first projection being positioned at one side of an upper part of the connecting pin in the standard pose of the movable housing, the second projection being positioned at another side of an upper part of the connecting pin in the standard pose of the movable housing; wherein the projection path includes a first path part, a second path part, and a third path part; the first path part extends at one side of the slide guide in upper and lower directions and the first projection passes through the first path part; the second path part extends at another side of the slide guide in upper and lower directions and the second projection passes through the second path part; the lower end of the first path part and the lower end of the second path part communicate so as to form a common path part where the first projection and the second projection pass; an engaging part is provided so that the cam or the base plate is always urged in a direction where the connecting pin slides upward; an engaging convex part where the first projection is engaged is formed at the upper end of the first path part and another engaging convex part where the second projection is engaged is formed at the upper end of the second path part; the engaging convex parts face a center line in the width direction of the slide guide in the standard pose of the movable housing; a first engaging concave part is formed at a lower end part of the first path part and the first projection is guided to the first engaging concave part when the movable housing is rotated 90 degrees in one direction from the standard pose; a second engaging concave part is formed at a lower end part of the second path part and the second projection is guided to the second engaging concave part when the movable housing is rotated 90 degrees in another direction from the standard pose; a third engaging concave part is formed at an upper part of an end part of a side of the common path part communicating with the first path part and the second projection is guided to the third engaging concave part when the movable housing is rotated 90 degrees in the one direction from the standard pose of the movable housing; and a fourth engaging concave part is formed at an upper part of an end part of a side of the common path part communicating with the second path part and the first projection is guided to the fourth engaging concave part when the movable housing is rotated 90 degrees in the other direction from the standard pose of the movable housing.

Other aspect of the present invention may be to provide an electronic device, including the slidable and rotational attaching unit as mentioned above, wherein the supporting base is rotatably attached to the base housing having an input part by a hinge; and the movable housing has a display part.

According to the first or second slidable and rotational attaching unit and the electronic device using the first or second slidable and rotational attaching unit, if the movable housing is rotated in a singe direction in a state where the movable housing is in a standard pose while the movable housing is pushed or lifted up along the supporting base, when the movable housing is rotated 90 degrees, the guide pin is guided to a second concave part of the plate cam. The movable housing stops so that a 90 degree pose change in the single direction is completed. If the movable housing is rotated in a reverse direction, the guide pin is guided to a first concave part of the plate cam. The movable housing stops so that return to the standard pose is completed.

In addition, if the movable housing is rotated in another direction while the movable housing is lifted along the base plate from the standard pose, when the movable housing is rotated 90 degrees, the guide pin is guided into a third concave part of the plate cam. The movable housing stops and therefore a 90 degree pose change is completed. If the movable housing is returned from the changed pose to the standard pose, the movable housing is rotated in a reverse direction.

According to the first or second slidable and rotational attaching unit and the electronic device using the third or fourth slidable and rotational attaching unit, in a state where the movable housing is in the standard pose, the first projection of the plate cam is engaged with an engaging convex part of the first path part, and the second projection of the plate cam is engaged with an engaging convex part of the second path part.

In a state where the movable housing is in the standard pose, if the movable housing is rotated in a single direction while the movable housing is lifted along the base plate, when the movable housing is rotated 90 degrees, the first projection of the plate cam is engaged with an engaging convex part of the first path part, and the second projection of the plate cam is engaged with one of the engaging convex parts of the common path. The movable housing stops and therefore a 90 degrees pose change is completed.

If the movable housing is rotated in the reverse direction, the first projection of the plate cam is engaged with the engaging convex part of the first path part, and the second projection of the plate cam is engaged with the engaging convex part of the second path part, so that the movable housing stops and returning to the standard pose is completed.

In addition, if the movable housing is rotated in another direction while the movable housing is lifted along the base plate from the standard pose, when the movable housing is rotated 90 degrees, the second projection of the plate cam is engaged with an engaging concave part of the second path part, and the first projection of the plate cam is engaged with one of the engaging concave parts of the common path. The movable housing stops and therefore a 90 degrees pose change in the other direction is completed. If the movable housing is returned from the changed pose to the standard pose, the movable housing is returned to the basic using state.

Thus, according to the first through fourth slidable and rotational attaching unit and the electronic device using the third or fourth slidable and rotational attaching unit, the movable housing can be attached to the supporting base so as to be rotated in the forward and reverse directions from the standard pose. Accordingly, it is not necessary to make an indication of the rotational directions. In addition, since the rotational operations are not performed in the wrong direction, damage of the attaching unit, the supporting base, and the attaching part to the movable housing is not generated. Furthermore, since the base plate and the plate cam are used, it is possible to smoothly perform the rotational operations.

Other objects, features, and advantages of the present invention will become more apparent from the following detailed description when read in conjunction with the accompanying drawings.

DETAILED DESCRIPTION OF THE PREFERRED EMBODIMENTS

A description of preferred embodiments of a slidable and rotational attaching unit and a folding type mobile phone as an example of an electronic device having the slidable and rotational attaching unit of the present invention is given below, with reference to the FIG. 1 through FIG. 15 of embodiments of the present invention.

First Embodiment

Corresponding to Claims 1, 2, 4, and 11 Through 13

Figure 1:
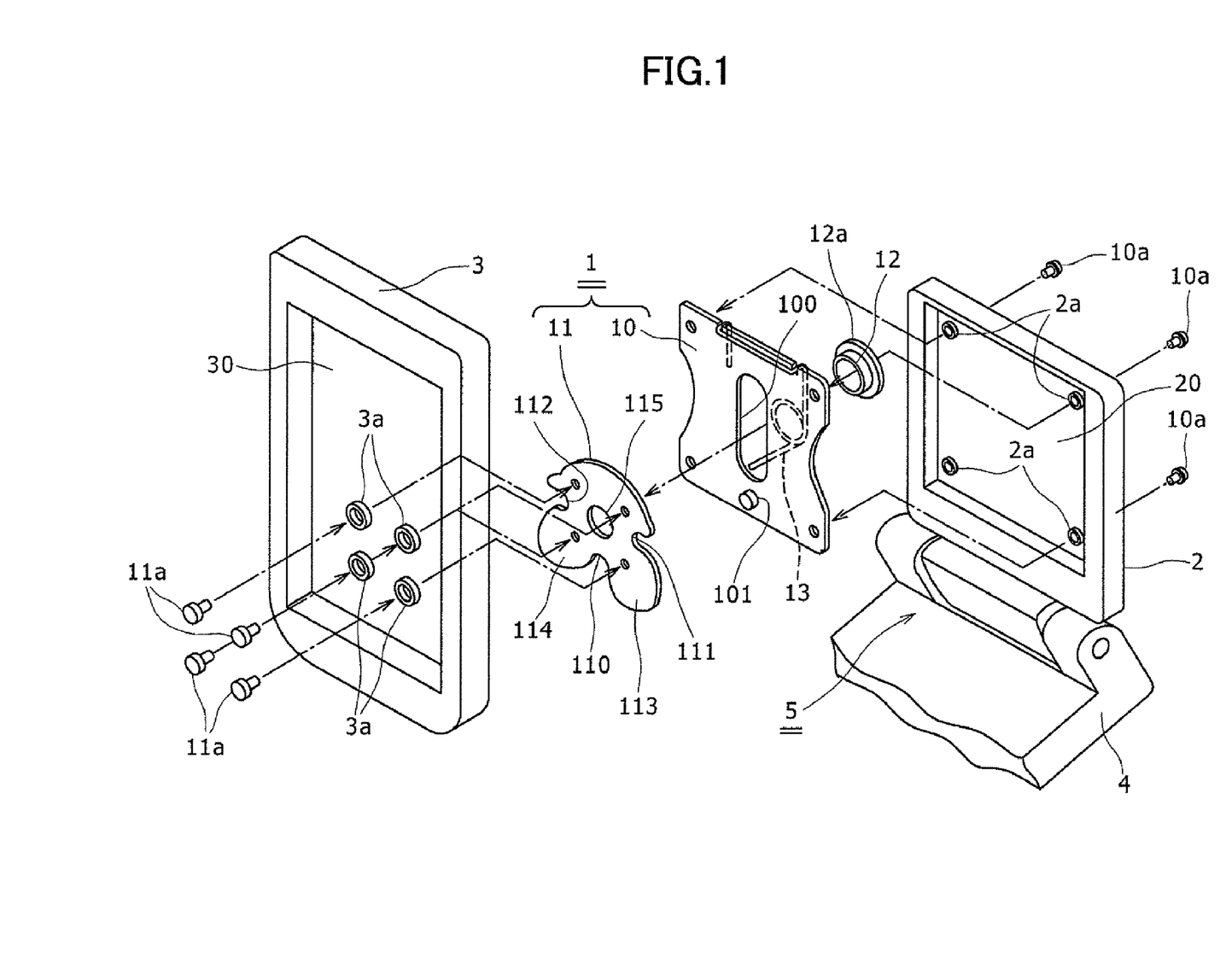
FIG. 1 is a partial exploded perspective view of a slidable and rotational attaching unit of the first embodiment of the present invention.
Figure 2:
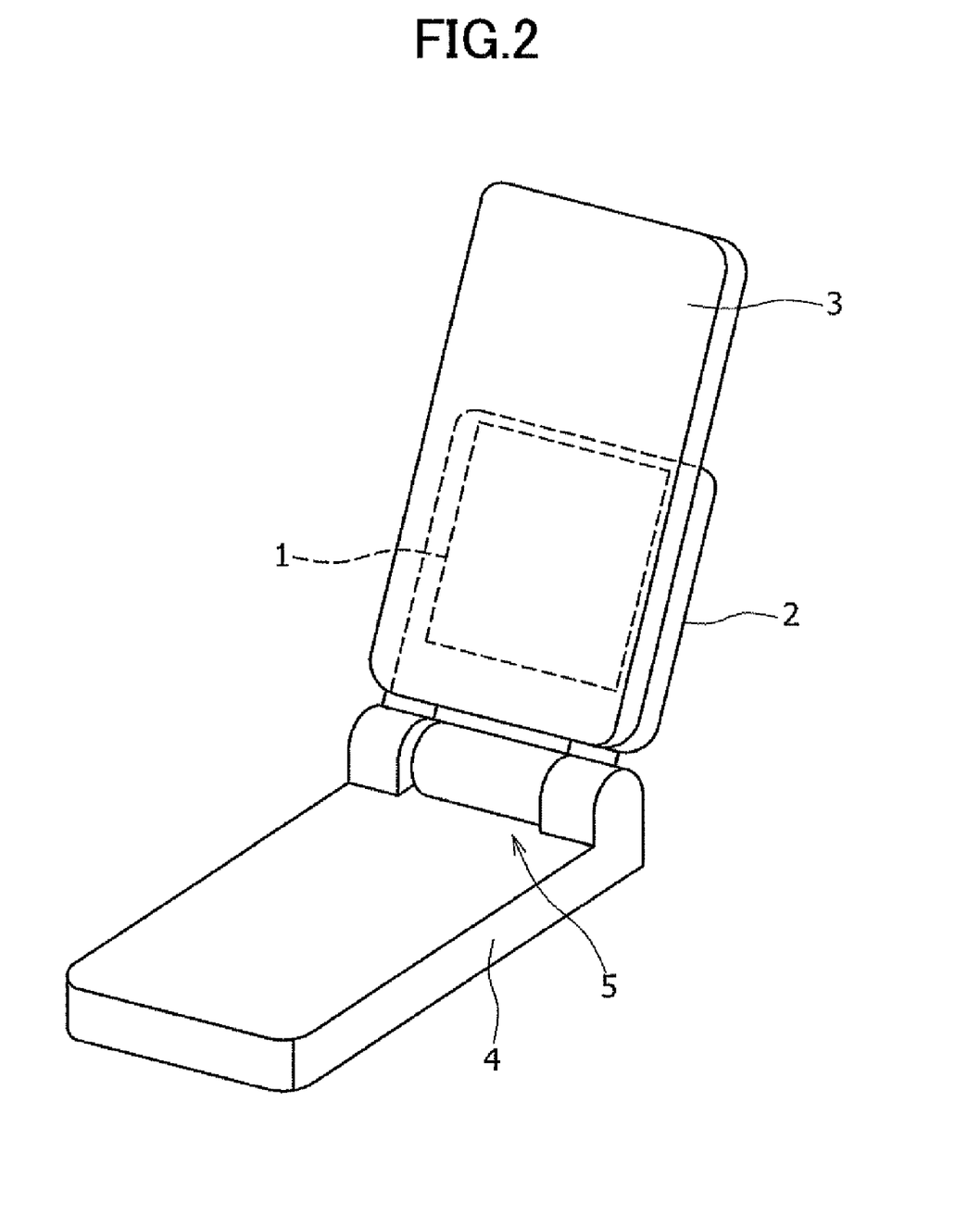
FIG. 2 is a perspective view of a folding type mobile phone as an electronic device using the slidable and rotational attaching unit shown in FIG. 1.
Figure 3:
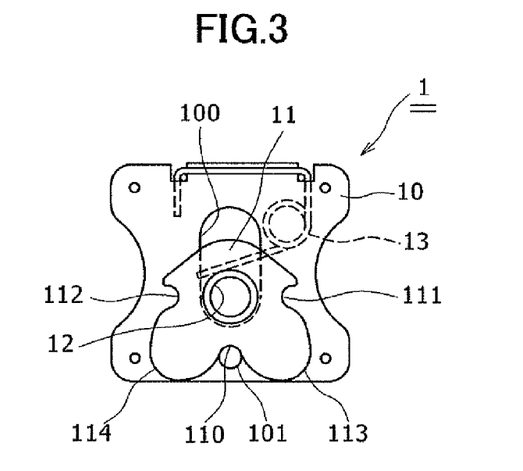
FIG. 3 is a plan view of the slidable and rotational attaching unit when a movable housing of the folding type mobile phone is in a standard pose.
Figure 4:
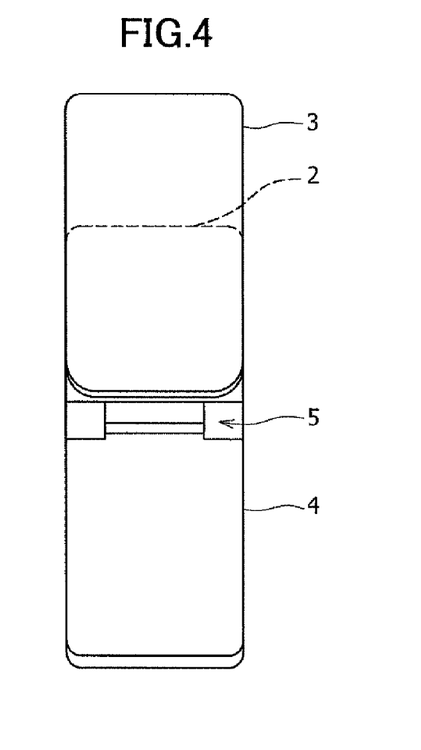
FIG. 4 is a plan view of the folding type mobile phone in a case where the slidable and rotational attaching unit is in the standard pose shown in FIG. 3.
Figure 5:
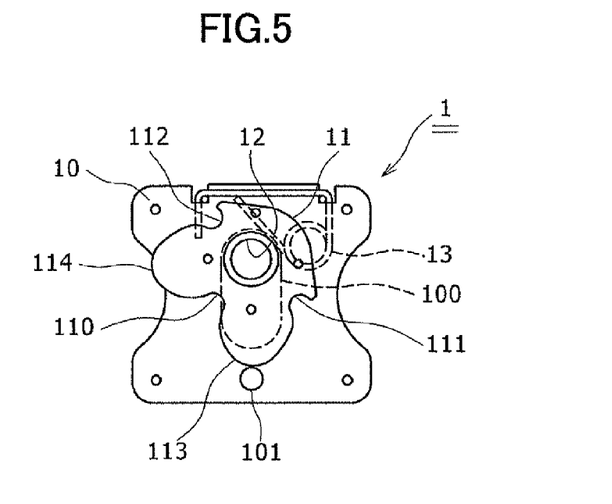
FIG. 5 is a plan view where a plate cam of the slidable and rotational attaching unit is rotated 45 degrees from the standard pose shown in FIG. 3.
Figure 6:
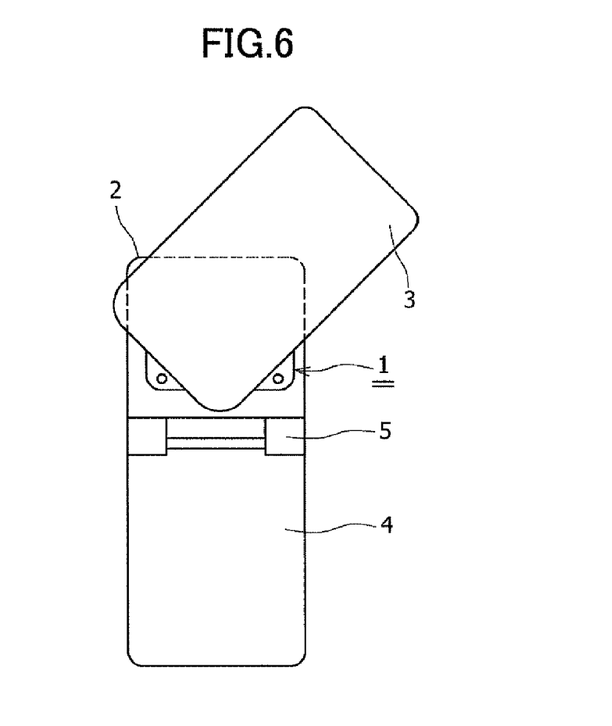
FIG. 6 is a plane view of the folding type mobile phone in a case where the slidable and rotational attaching unit is in the pose shown in FIG. 5.
Figure 7:
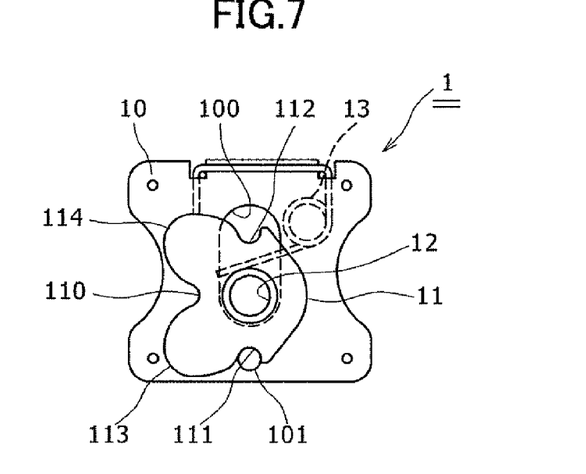
FIG. 7 is a plan view where the plate cam of the slidable and rotational attaching unit is rotated 45 degrees from the pose shown in FIG. 5.
Figure 8:
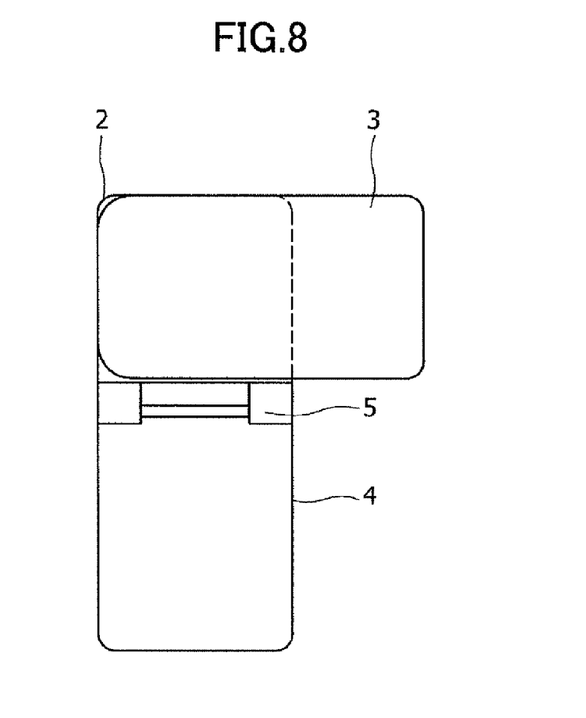
FIG. 8 is a plan view of the folding type mobile phone in a case where the slidable and rotational attaching unit is in the pose shown in FIG. 7.

FIG. 1 is a partial exploded perspective view of a slidable and rotational attaching unit 1 of the first embodiment of the present invention. FIG. 2 is a perspective view of a folding type mobile phone as an electronic device using the slidable and rotational attaching unit 1 shown in FIG. 1. FIG. 3 is a plan view of the slidable and rotational attaching unit 1 when a movable housing of the folding type mobile phone is in a standard pose. FIG. 4 is a plan view of the folding type mobile phone in a case where the slidable and rotational attaching unit 1 is in the standard pose shown in FIG. 3. FIG. 5 is a plan view where a plate cam of the slidable and rotational attaching unit 1 is rotated 45 degrees from the standard pose shown in FIG. 3. FIG. 6 is a plan view of the folding type mobile phone in a case where the slidable and rotational attaching unit 1 is in the pose shown in FIG. 5. FIG. 7 is a plan view where the plate cam of the slidable and rotational attaching unit 1 is rotated 45 degrees from the pose shown in FIG. 5. FIG. 8 is a plan view of the folding type mobile phone in a case where the slidable and rotational attaching unit 1 is in the pose shown in FIG. 7.

As shown in FIG. 1 and FIG. 2, a supporting base 2 is foldably connected to one end part of a base housing 4 of a mobile phone having a microphone part and an input part (not shown in FIG. 1 and FIG. 2). The supporting base 2 can be folded, via a hinge 5, from a state where the supporting base 2 is overlapped with the base housing 4 to a state where an angle of approximately 150 through 170 degrees is formed between the supporting base 2 and the base housing 4.

A movable housing 3 having an earphone part and a display part (not shown in FIG. 1 and FIG. 2) is slidably and rotatably attached to the supporting base 2 via the slidably and rotationally attaching unit 1 of a first embodiment of the present invention.

As shown in FIG. 1, the slidably and rotationally attaching unit 1 includes a base plate 10 and a plate cam 11 provided between the supporting base 2 and the movable housing 3. The base plate 10 is attached to the supporting base 2. The plate cam 11 is attached to the movable housing 3.

A slide guide 100 is formed in the substantially center part of the base plate 10. The slide part 100 is formed by a slit or a groove along upper and lower directions of the base plate 10 in a standard pose, namely a basic using mode (a mode where a shorter side of the movable housing 3 is at the top). A guide pin 101 projecting to the plate cam 11 side is provided on an extended line of a lower end part of the slide guide 100 of the base plate 10.

A connecting pin 12 is provided to the plate cam 11. The connecting pin 12 is slidably and rotatably engaged with the slide guide 100 in a manner to prevent coming-off. The plate cam 11 and the base plate 10 are slidably and rotatably connected to each other by the connecting pin 12.

The connecting pin 12 of the first embodiment of the present invention includes a hollow part formed in an axial direction. A flange shaped engaging part 12a is provided at one end part of the connecting pin 12. The engaging part 12a is engaged with the slide guide 100 so that the connecting pin 12 is prevented coming off from the slide guide 100. Another end of the connecting pin 12 pierces and is fixed into an attaching hole 115 of the plate cam 11 so as to be attached to the plate cam 11.

A first concave part 110, a second concave part 111, and a third concave part 112 are formed at external circumference of the plate cam 11. When the movable housing 3 is in the standard pose, the guide pin 101 is guided in the first concave part 110. When the moving housing 3 is rotated 90 degrees in one direction (clockwise) from the standard pose, the guide pin 101 is guided in the second concave part 111. When the moving housing 3 is rotated 90 degrees in another direction (counterclockwise) from the standard pose, the guide pin 101 is guided in the third concave part 112.

In this embodiment, an urging member 13 configured to always urge the plate cam 11 in a lower direction is provided at a rear side of the base plate 10. An end part of the urging member 13 is connected with an upper end part of the base plate 10. The urging member 13 can be configured to urge the base plate 10 in a direction where the guide pin 101 is guided in each of the concave parts 110, 111, and 112 of the plate cam 11. However, it is preferable that the urging member 13 be provided so that the urging force is applied in a direction where loads on the movable housing 3 are applied to the plate cam 11.

Furthermore, in this embodiment, when the plate cam 11 is rotated as discussed above, one of the external circumferential parts of a convex part 113 in a circumferential direction between the first concave part 110 and the second concave part 111 and another external circumferential part of a convex part 114 in a circumferential direction between the first concave part 110 and the third concave part 112 are in sliding contact with the guide pin 101.

The movable housing 3 is slidably and rotatably attached to the supporting base 2 by the slidable and rotationally attaching unit 1 of this embodiment, as discussed below.

The base plate 10 and the plate cam 11 are slidably and rotatably connected to each other by the connecting pin 12 in a state where an urging force of the urging member 13 is applied to the plate cam 11.

The base plate 10 is fixed to the supporting base 2 by small screws 10a. Each of the small screws 10a is inserted in the corresponding screw guide 2a provided in a bottom plate 20 of the supporting base 2 from a rear side of the supporting base 2.

On the other hand, the plate cam 11 is fixed to a rear side of the movable housing 3 by small screws 11a. Each of the small screws 11a is inserted in the corresponding screw guide 3a provided in a bottom plate 30 of the movable housing 3 from a front surface side of the movable housing 3.

The movable housing 3 is attached to the supporting base 2 so that the lower end part of the movable housing 3 does not come in contact with the hinge 5 when the movable housing 3 is rotated after the movable housing 3 is attached to the supporting base 2.

As discussed above, in the folding type mobile phone where the movable housing 3 is attached to the supporting base 2 by the slidable and rotational attaching unit 1, when the movable housing 3 is in the standard pose as shown in FIG. 4 (the display part is in the basic mode where the shorter side of the display part is at the top), the guide pin 101 of the base plate 10 is guided in the first concave part 110 of the plate cam 11 as shown in FIG. 3.

In addition, the connecting pin 12 is positioned at the lower end part of the slide guide 110.

In order to change the movable housing 3 from the standard pose to a mode where a longer side of the movable housing 3 is at the top, the movable housing 3 is rotated 90 degrees. More specifically, as shown in FIG. 6, while the movable housing 3 is pushed (lifted) up along the supporting base 2, the movable housing 3 is rotated. At this time, while the connecting pin 12 is moved upward along the slide guide 100, the connecting pin 12 is rotated.

When the movable housing 3 is rotated 45 degrees clockwise as shown in FIG. 6, the guide pin 101 of the slidable and rotational attaching unit 1 is in sliding contact with a projection end of the convex part 113 in a circumferential direction between the first concave part 110 and the second concave part 111. When the movable housing 3 is slightly rotated clockwise in this state, due to the urging member 13 and the own weight, the movable housing 3 together with the plate cam 11 is rotated clockwise 90 degrees as shown in FIG. 7 and FIG. 8. The guide pin 101 is guided in the second concave part 111 of the plate cam 11 so that the movable housing 3 stops and in a state where the longer side of the movable housing 3 is at the top.

The portable phone as an electronic device includes a switch (not shown) configured to switch a mode (display mode) of the movable housing 3 based on the pose of the movable housing 3 at the same time when the movable housing 3 is switched clockwise to a state where the longer side is at the top so that the guide pin 101 is guided in the second concave part 111.

In order to change the movable housing 3 to the state where the shorter side of the movable housing 3 is at the top, the movable housing 3 is rotated counterclockwise more than 45 degrees from the state shown in FIG. 8 so that the movable housing 3 returns the standard pose shown in FIG. 4.

The portable phone includes a switch (not shown) configured to switch a mode (display mode) of the movable housing 3 based on the pose of the movable housing 3 at the same time when the state of the movable housing 3 is switched so that the guide pin 101 is guided in the first concave part 110.

When the movable housing 3 is rotated 90 degrees counterclockwise from the standard pose shown in FIG. 4 or returned from this state to the standard pose, the movable housing 3 is operated in a direction opposite to the above-discussed direction.

The portable phone includes a switch (not shown) configured to switch a mode (display mode) of the movable housing 3 based on the pose of the movable housing 3 at the same time when the movable housing 3 is switched so that the guide pin 101 is guided in the third concave part 112.

Thus, according to the slidable and rotational attaching unit 1, the movable housing 3 can be attached to the supporting base 2 so as to be rotated in the forward and reverse directions from the standard pose. Accordingly, it is not necessary to make an indication of the rotational directions. In addition, since the rotational operations are not performed in the wrong direction, damage to the attaching unit 1, the supporting base 2, and the attaching part to the movable housing 3 is not generated. Furthermore, since the plate cam 11 is used, it is possible to smoothly perform the rotational operations.

Since the urging member 13 is provided, even if the own weight of the movable housing 3 is light, the movable housing 3 may be stable due to the urging member 13 even when an external force in a vibration or shaking direction is applied to the movable housing 3.

As discussed above, when the plate cam 11 is rotated as discussed above, one of the external circumferential part of a convex part 113 in a circumferential direction between the first concave part 110 and the second concave part 111 and the external circumferential part of a convex part 114 in a circumferential direction between the first concave part 110 and the third concave part 112 is in sliding contact with the guide pin 101. Accordingly, it is possible to rotate the movable housing 3 more smoothly.

2. Second Embodiment

Corresponding to Claims 1, 2, 4, and 11 Through 13

Figure 9:
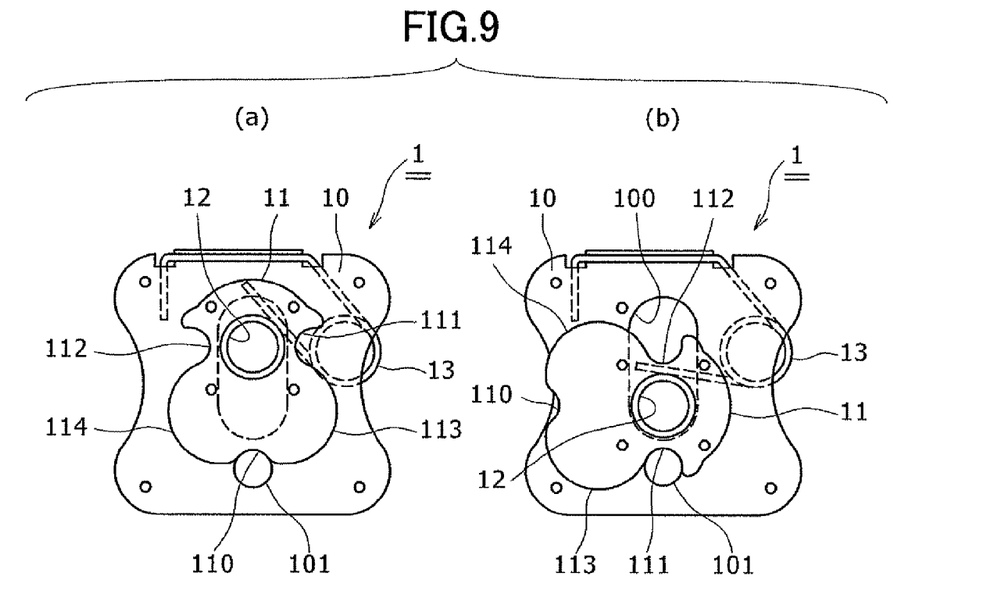
FIG. 9 is a schematic view of a main part of a slidable and rotational attaching unit of a second embodiment of the present invention (FIG. 9(a) is a plan view where the slidable and rotational attaching unit is in a standard pose and FIG. 9(b) is a plan view where the slidable and rotational attaching unit is rotated 90 degrees clockwise from the standard pose)
Figure 10:
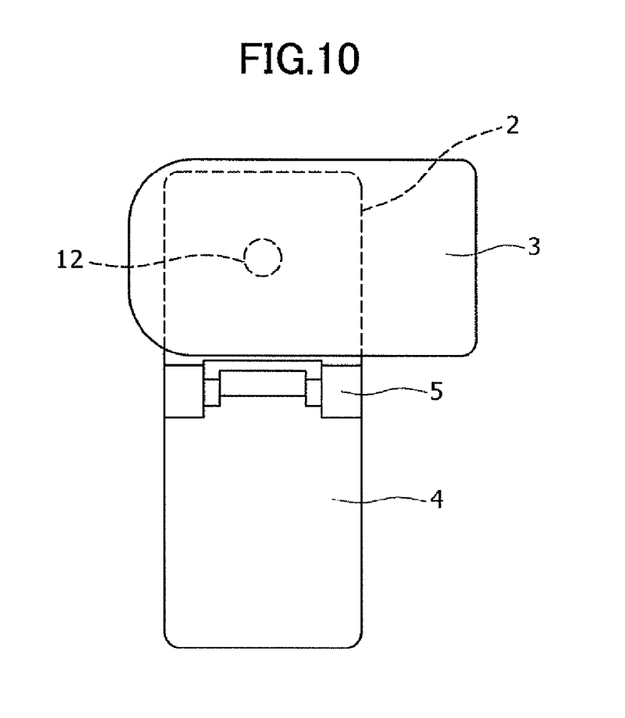
FIG. 10 is a plan view of the folding type mobile phone where the lidable and rotational attaching unit is in the pose shown in FIG. 9(b)

FIG. 9 is a schematic view of a main part of a slidable and rotational attaching unit of a second embodiment of the present invention (FIG. 9(a) is a plan view of a state where the slidable and rotational attaching unit 1 is in a standard pose and FIG. 9(b) is a plan view of a state where the slidable and rotational attaching unit 1 is rotated 90 degrees clockwise from the standard pose. FIG. 10 is a plan view of the folding type mobile phone in a state where the lidable and rotational attaching unit 1 is in the pose shown in FIG. 9(b).

In the attaching unit of the second embodiment of the present invention, when the movable housing 3 is attached to the supporting base 2 of the folding type mobile phone and the movable housing 3 is rotated 90 degrees in either direction from the standard pose as shown in FIG. 10, the supporting base 2 is positioned to be shifted to the center part of the movable housing 3.

Because of this, in this embodiment compared to the first embodiment, the slide guide 100 of the base plate 10 is positioned to be shifted to an upper part and formed longer. On the other hand, straight line distances between the first concave part 110 of the plate cam 11 and the second concave parts 111 and the third concave parts 112 are longer than that in the first embodiment.

Other structures and effect of the attaching unit 1 of this embodiment and the folding type mobile phone shown in FIG. 10 and using this attaching unit 1 are the same as the attaching unit 1 of the first embodiment of the present and the mobile phone using the attaching unit 1 of the first embodiment. Accordingly, explanation thereof is omitted.

Modified Example of the First and Second Embodiments

In a case where it is expected that the supporting base 2 will be positioned in the center part of the movable housing 3 when the movable housing 3 is rotated 90 degrees in either direction, the slide guide 100 of the base plate 10 may be positioned so as to be shifted to a more upper part and be longer for corresponding to a change amount when the movable housing 3 is rotated, and the straight line distance between the first concave part 110 and the second and third concave parts 111 and 112.

In the above-discussed embodiments, the base plate 10 of the slidable and rotational attaching unit 1 is attached to the supporting base 2 and the plate cam 11 is attached to the movable housing 3. However, the present invention is not limited to this. The base plate 10 may be attached to the movable housing 3 and the plate cam 11 may be attached to the supporting base 2.

In this case, a pose of the slidable and rotational attaching unit 1 is opposite. In other words, in the standard pose of the movable housing 3, the guide pin 101 of the base plate 10 is attached on an extended line of an upper end part of the slide guide 100 and therefore the pose of the plate cam 11 is opposite.

In this case, if the urging member can urge in a direction where the guide pin 101 is guided in each concave part 110, 111, or 112 of the plate cam 11, the urging member 13 can be provided so that the urging force is applied to the plate cam 11. However, it is preferable that the urging member 13 be provided so that the urging force is applied in a direction where the own weight is applied to the base plate 10.

In this example, loads of the movable housing 3 are not applied in a direction where the guide pin 101 is guided to each of the concave parts 110, 111 and 112. In other words, the loads of the movable housing 3 are applied, only in the standard pose, in a direction where the guide pin 101 is guided to the first concave part 110. Hence, the urging member 13 is provided (see claims 3, 4 and 11).

In the first embodiment of the present invention, the loads of the movable housing 3 are applied in a direction where the guide pin 101 is guided to the concave part 110, 111, or 112. Accordingly, if the load of the movable housing 3 is greater than a certain value so that stability of the movable housing 3 can be maintained despite of vibration or shaking normally applied, it is not necessary to provide the urging member 13.

In a case where the loads of the movable housing 3 are large, it is preferable that the guide pin 101 be a roller configured to be rotated so that the movable housing 3 can be smoothly operated. (see claim 5).

In the first embodiment of the present invention, a harness is provided in the hollow part of the connecting pin 12 communicating in the axial direction so that the harness is provided from the base housing 4 side to the movable housing 3 side via an internal space of the supporting base 2. If there is no need to provide such a harness, the connecting pin 12 may be solid.

In the first embodiment of the present invention, the convex parts 113 and 114 have the configurations shown in FIG. 1 so that the guide pin 101 slides on the convex parts 113 and 114 of the plate cam 11 when the movable housing 3 is rotated in the corresponding directions and thereby the movable housing 3 can be smoothly rotated. In a case where the movable housing 3 is rotated in such a manner to be pushed or lifted up along the surface of the supporting base 10, it is not necessary to make the convex parts 113 and 114 have the configurations discussed above.

Third Embodiment

Corresponding to Claims 6, 7, and 9 Through 13

Figure 11:
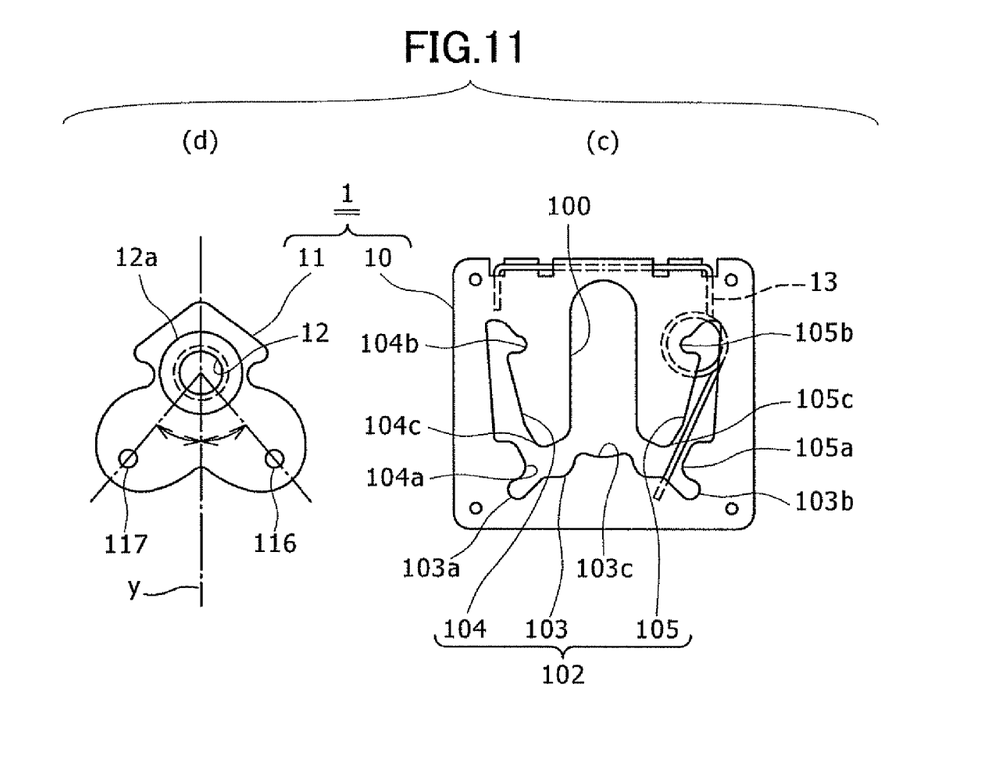
FIG. 11 is a view showing a slidable and rotational attaching unit of a third embodiment of the present invention (FIG. 11(c) is a plan view of the base plate and FIG. 11(d) is a rear surface of the plate cam)
Figure 12:
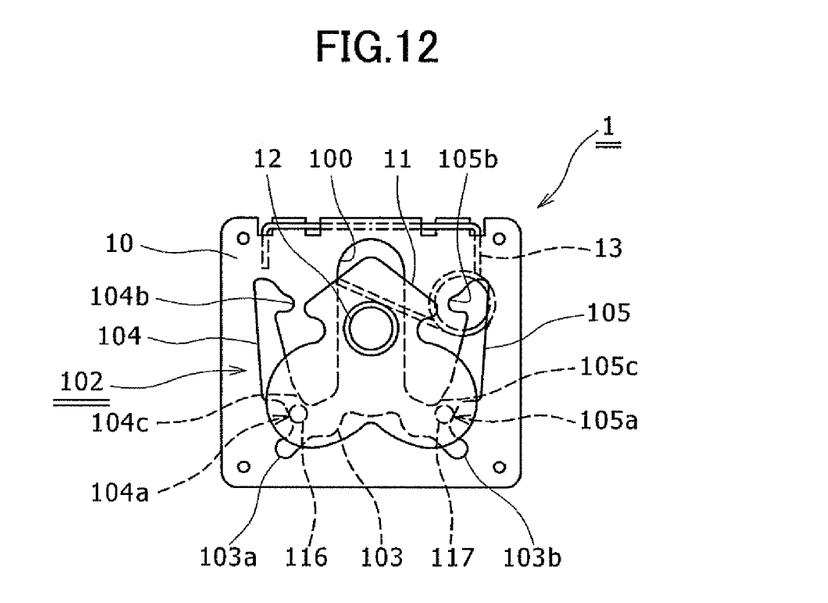
FIG. 12 is a plan view of the slidable and rotational attaching unit where the plate cam shown in FIG. 11(d) is overlapped with and connected to the base plate shown in FIG. 11(c)
Figure 13:
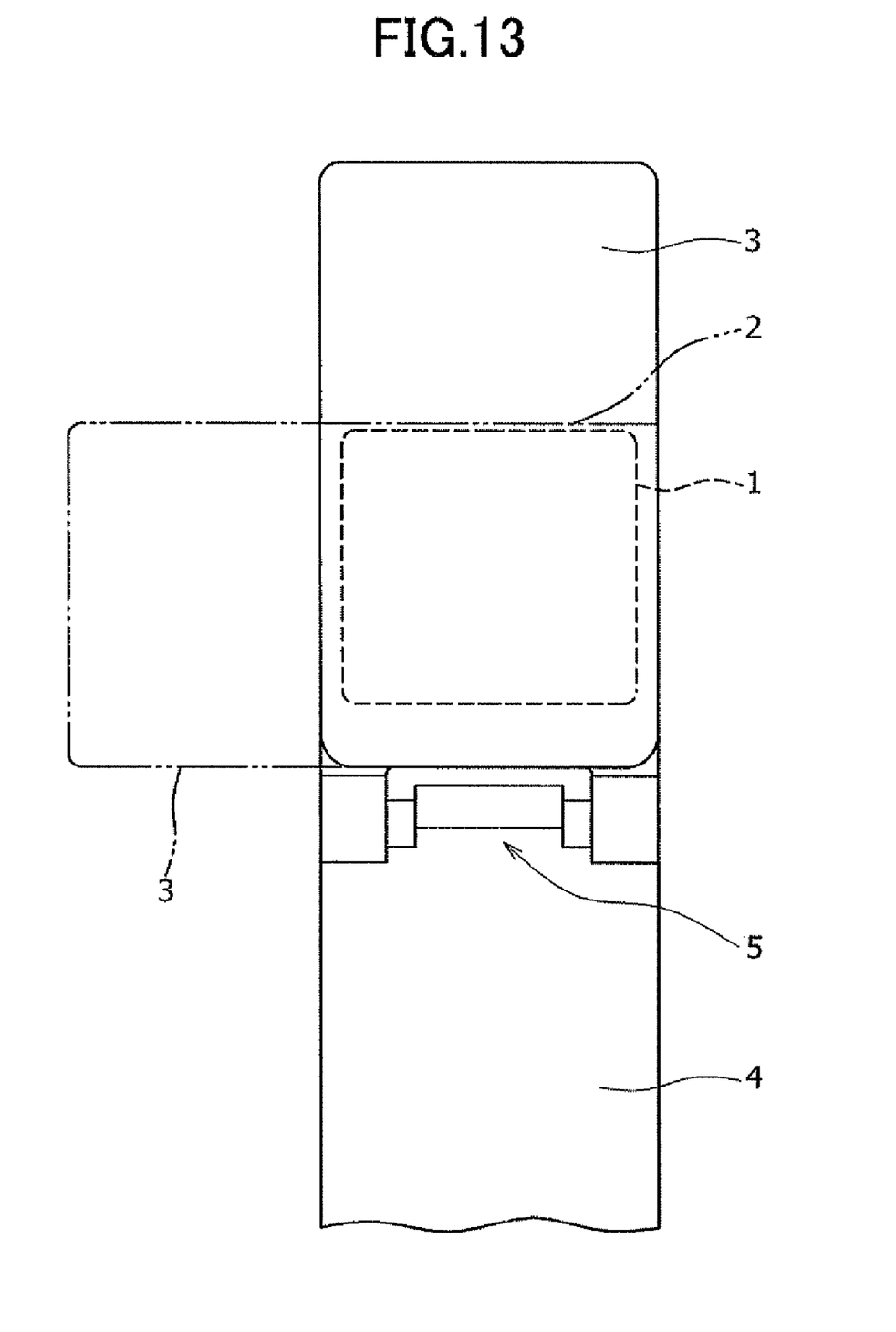
FIG. 13 is a partial plan view of a folding type mobile phone as an electronic device where the slidable and rotational attaching unit shown in FIG. 12 is used.
Figure 14:
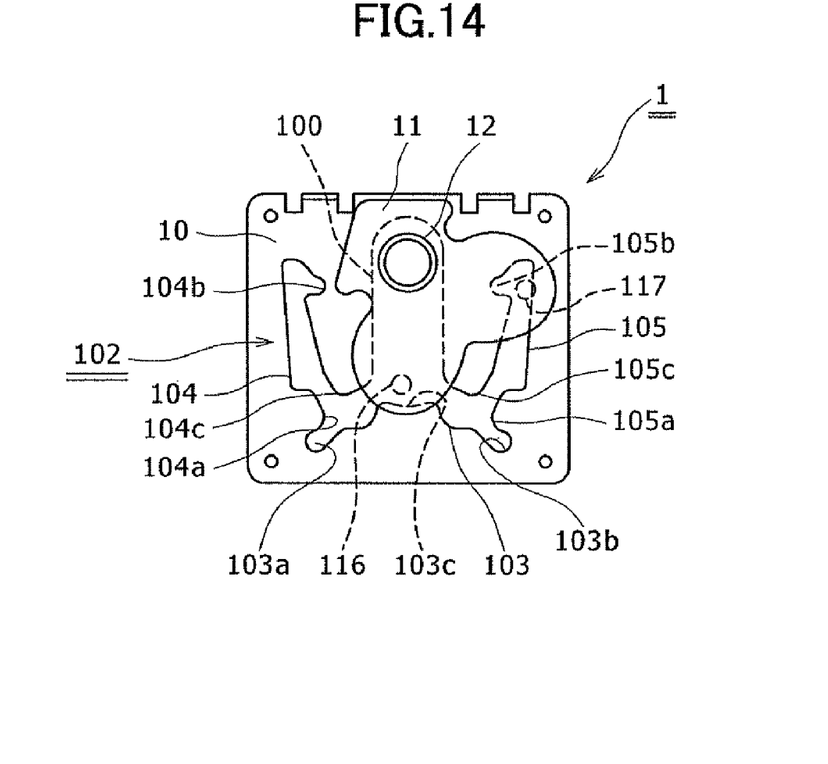
FIG. 14 is a plan view where the plate cam of the slidable and rotational attaching unit is rotated 45 degrees counterclockwise from the pose shown in FIG. 12.
Figure 15:
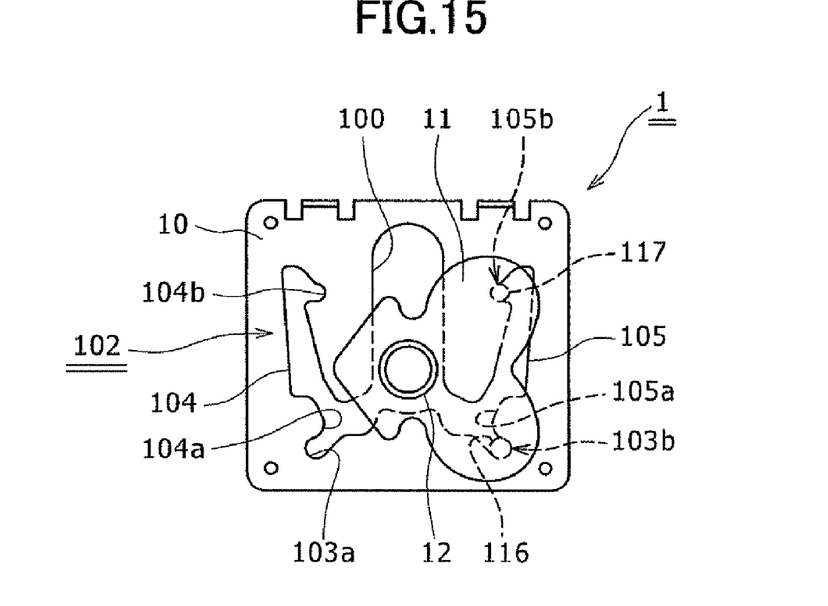
FIG. 15 is a plan view where the plate cam of the slidable and rotational attaching unit is rotated 45 degrees counterclockwise from the pose shown in FIG. 14.

FIG. 11 is a view showing a slidable and rotational attaching unit of a third embodiment of the present invention (FIG. 11(c) is a plan view of the base plate and FIG. 11(d) is a rear surface of the plate cam). FIG. 12 is a plan view of the slidable and rotational attaching unit 1 in a pose where the plate cam shown in FIG. 11(d) is overlapped with and connected to the base plate shown in FIG. 11(c). FIG. 13 is a partial plan view of a folding type mobile phone as an electronic device where the slidable and rotational attaching unit shown in FIG. 12 is used. FIG. 14 is a plan view where the plate cam of the slidable and rotational attaching unit 1 is rotated 45 degrees counterclockwise from the pose shown in FIG. 12. FIG. 15 is a plan view where the plate cam of the slidable and rotational attaching unit is rotated 45 degrees counterclockwise from the pose shown in FIG. 14.

In the third embodiment of the present invention, a connecting structure of the supporting base and the base housing 5, a structure where the base plate 10 is attached to the supporting base 2 and the plate cam 11 is attached to the movable housing 3, a structure of the connecting pin 12, a structure where the plate cam 11 is slidably and rotatably attached to the base plate 10 by the slide guide 100 and the connecting pin 12, and a structure of the urging member 13, are substantially the same as those in the first embodiment of the present invention.

Accordingly, parts that are discussed in the first embodiment are given the same reference numbers and explanation thereof is omitted.

On a surface side of the base plate 10 facing the plate cam 11, a slide guide 100 and a path 102 for projection are formed. The slide guide 100 is formed by a slit (or groove) along upper and lower direction in the standard pose that is the basic state of the movable housing 3. The path 102 for projection is formed by a slit (or groove).

On a surface side of the plate cam 11 facing the base plate 10, a connecting pin 12 is provided so as to be slidably and rotatably engaged with the slide guide 100 and prevent the base plate 10 coming off from the slide guide 100.

In the standard pose of the movable housing 3, a first projection 116 is positioned at one side of a lower part of the connecting pin 12 and a second projection 117 is positioned at another side of the lower part of the connecting pin 12.

The path 102 for projection includes a first path part 104, a second guide part 105, and a common path part 103. The first path part 104 is formed in upper and lower directions at a side of the slide guide 100. The first projection 116 is provided in the first path part 104. The second guide part 105 is formed in upper and lower directions at another side of the slide guide 100. The second projection 117 is provided in the second guide part 105. The common path part 103 is formed by connecting lower end parts of the first path part 104 and the second path part 105. The projections 116 and 117 are provided in the common path part 103.

When the movable housing 3 is in the standard pose, an engaging convex part 104a where the first projection 116 of the plate cam 11 is engaged is provided at a lower end part of the first path part 104. An engaging convex part 105a where the second projection 117 of the plate cam 11 is engaged is provided at a lower end part of the second path part 105. The engaging convex parts 104 and 105 face a direction of a center line in a width direction of the slide guide 100.

An engaging concave part 104b is formed at an upper end part of the first path part 104. When the movable housing 3 is rotated 90 degrees in one direction from the standard pose, the first projection 116 is guided to the engaging concave part 104b.

An engaging concave part 105b is formed at an upper end part of the second path part 105. When the movable housing 3 is rotated 90 degrees in another direction from the standard pose, the second projection 117 is guided to the engaging concave part 105b.

The common path part 103 includes an engaging concave part 103a. The engaging concave part 103a is provided at a lower end part of a side communicating with the first path part 104. The second projection 117 is guided to the engaging concave part 103a when the movable housing 3 is rotated 90 degrees in one direction from the standard pose.

The engaging concave part 103b is provided at a lower end part of a side communicating with the second path part 105. The first projection 116 is guided to the engaging concave part 103b when the movable housing 3 is rotated 90 degrees in another direction from the standard pose.

The urging member (spring) 13 always urges the plate cam 11 or the base plate 10 in a direction to cause the connecting pin 12 to slide downward. In this embodiment as well as the first embodiment, the urging member 13 is attached to the base plate 10 so that the connecting pin 12 is urged downward.

By attaching the urging member 13 to the plate cam 11 in a state where the base plate 10 is urged upward, it is possible to apply the urging force in a direction so that the connecting pin 12 always slides downward.

As shown in FIG. 11(d), the plate cam 11 has a plan view external configuration where an upper part is diamond-shaped and a lower part is heart-shaped. However, the configuration of the plate cam 11 is not limited to this. The plate cam 11 may have other configurations as long as the connecting pin 12 and the first and second projections 116 and 117 are attached and the plate cam 11 does not interfere with other members.

Angles between the first projection 116 and the second projection 117 provided in the plate cam 11 and a vertical line y passing through the center of the connecting pin 12 are the same as each other (40 through 45 degrees) as shown in FIG. 11(d). The first projection 116 and the second projection 117 have the same length from the center of the connecting pin 12.

Accordingly, the first and second path parts 104 and 105, the engaging convex parts 104a and 105a, the engaging concave parts 104b and 105b, and the engaging concave parts 103a and 103b are positioned in a symmetrical manner right and left with respect to the center line in the width direction of the slide guide 100 of the base plate 10.

Because of the positional relationships between the connecting pin 12 and the first and second projections 116 and 117, the common guide 103 of the base plate 10 and the lower end part of the slide guide 100 are in communication with each other.

The common path part 103 has a configuration curved to the center direction of the slide guide 100. When the first projection 116 and the second projection 117 move in the common path 103, the concave part 103c configured to guide the first projection 116 and the second projection 117 is bent in a direction opposite to the curved configuration of the common guide part 103.

Action of a case shown in FIG. 13 where the slidable and rotationally attaching unit 1 of this embodiment is used for the folding type mobile phone is discussed below.

When the movable housing 3 as an earphone side housing is in a standard pose that is a normal using state as shown in FIG. 13 by a solid line, as shown in FIG. 12, the first projection 116 of the plate cam 11 is engaged with the engaging convex part 104a of the lower end part of the first path part 104 and the second projection 117 of the plate cam 12 is engaged with the engaging convex part 105a of the lower end part of the first path part 105. Accordingly, the movable housing 3 is in the state where the longer side of the movable housing 3 is at the top.

In this standard pose, when the movable housing 3 moves upward several mm (approximately 3 through 5 mm in this embodiment) due to an external force, the first projection 116 and the second projection 117 come in contact with convex shaped stoppers 104c and 105c projecting downward at lower ends of the first path part 104 and the second path part 105, respectively. Hence, the upward movement of the movable housing 3 is limited.

In the state where the movable housing 3 is in the standard pose, when the movable housing 3 is rotated counterclockwise while the movable housing 3 is pushed or lifted up along the supporting base 2, the plate cam is in an intermediate pose as shown in FIG. 14.

When the movable housing 3 is rotated approximately 10 degrees from the pose shown in FIG. 14, the movable housing 3 is rotated counterclockwise even if the movable housing 3 is released from a hand of the operator. When the movable housing 3 is rotated 90 degrees as shown in FIG. 15, the second projection 117 is guided to and engaged with the engaging concave part 105b of the second path part 105, and the first projection 116 is guided to and engaged with the engaging concave part 103b of the common path part 103. As a result of this, the movable housing 3 stops and therefore 90 degree pose change in the counterclockwise direction is completed as shown by the two-point dotted line in FIG. 13.

During a process where the movable housing 3 is rotated counterclockwise as discussed above, when the movable housing 3 is rotated approximately 45 degrees and the movable housing 3 is released from the hand of the operator, the first projection 116 is guided to the concave part 103c of the common path part 103. As a result of this, the movable housing 3 stops in an intermediate state where the movable housing 3 is inclined approximately 45 degrees in a left direction in FIG. 13.

When the movable housing 3 is rotated clockwise from the state shown in the second dotted line in FIG. 13, the first projection 116 of the plate cam 11 comes in contact with the engaging convex part 104a of the first path part 104, and the movable housing 3 is released from the hand of the operator while the movable housing 3 is slightly lifted up, the first projection 116 is engaged with the engaging convex part 104a and the second projection 117 is engaged with the engaging convex part 105a of the second path part 105. As a result of this, the movable housing 3 stops and return to the standard pose is completed.

Cases where the movable housing 3 is rotated 90 degrees clockwise from the standard pose and is returned from the above-mentioned 90 degree rotated state to the standard pose are discussed with reference to FIG. 14 and FIG. 15.

When the movable housing 3 is rotated clockwise from a standard pose while the movable housing 3 is pushed or lifted up along the supporting base 2, the plate cam 11 is in an intermediate pose where the plate cam 11 is inclined 45 degrees in a direction opposite to the pose shown in FIG. 14. At this time, when the movable housing 3 is released from the hand of the operator, the second projection 117 is guided to the concave part 103c in the center of the common path part 103. As a result of this, the movable housing 3 stops while the intermediate state where the movable housing is inclined 45 degrees in a right direction of FIG. 14 is maintained.

When the movable housing 3 is rotated approximately 10 degrees clockwise from this state, the movable housing 3 is rotated clockwise even if the movable housing 3 is released from a hand of the operator. When the movable housing 3 is rotated 90 degrees in a direction opposite to the case shown in FIG. 15, the first projection 116 is guided to and engaged with the engaging concave part 104b of the first path part 104, and the second projection 117 is guided to and engaged with the engaging concave part 103a of the common path part 103. As a result of this, the movable housing 3 stops and therefore a 90 degree pose change in the clockwise direction is completed.

When the movable housing 3 is rotated counterclockwise from this state, the second projection 117 of the plate cam 11 comes in contact with the engaging convex part 105a of the second path part 105, and the movable housing 3 is released from the hand of the operator while the movable housing 3 is slightly lifted up, the first projection 116 is engaged with the engaging convex part 104a and the second projection 117 is engaged with the engaging convex part 105a of the second path part 105. As a result of this, the movable housing 3 stops and returning to the standard pose is completed.

When the movable housing 3 is in the standard pose or is converted 90 degrees in either direction, as shown in FIG. 13, the movable housing 3 comes in contact with the hinge 5 of the mobile phone. Accordingly, even if processing precision of the projection path 102 formed by the first guide part 104 and the third guide part 105 and the common path part 103 is not high, the movable housing can be smoothly operated.

Thus, according to the slidable and rotational attaching unit of this embodiment, the movable housing 3 can be attached to the supporting base 10 so as to be rotated in the forward and reverse directions from the standard pose. Accordingly, it is not necessary to make an indication of the rotational directions. In addition, since the rotational operations are not performed in the wrong direction, damage to the attaching unit 1, the supporting base 2, and the attaching part to the movable housing 3 is not generated. Furthermore, since the base plate 10 and the plate cam 11 discussed above are used, it is possible to smoothly perform the rotational operations.

Modified Example of the Third Embodiment

In order to position the supporting base 2 in the center part of the movable housing 3 when the movable housing 3 is rotated 90 degrees in either direction, corresponding to a changing amount when the movable housing 3 is rotated, it is necessary for the slide guide 100 of the base plate 10 to be positioned in a further upper part and be longer. In addition, a gap between the first projection 116 and the second projection 117 of the plate cam 11 should be larger and the projection path 102 should be designed corresponding to this.

In the third embodiment of the present invention, the loads of the movable housing 3 are applied in each pose of the movable housing 3 in a direction where the connecting pin 12 slides downward. Accordingly, in a case where the loads of the movable housing 3 are greater than a certain amount where the movable housing 3 is stable when vibration and swing are generated in a normal use state, there is no need to provide the urging member 13.

In the third embodiment, the slidable and rotational attaching unit 1 is attached to the supporting base 2 of the base plate 10 and the plate cam 11 is attached to the movable housing 3. The base plate 10 may be attached to the movable housing 3 and the plate cam 11 may be attached to the supporting base 2.

In this case, it is necessary to make the pose of the slidable and rotational attaching unit 1 opposite to that of the third embodiment.

In this case, if the connecting pin 12 is urged upward, the urging member 13 can be provided so that the urging force is applied to the plate cam 11. However, it is preferable to provide the urging member 13 so that the urging force is applied in a direction where the own weight is applied to the base plate 10.

In this state, the loads of the movable housing 3 are not applied in each pose of the movable housing 3 in a direction where the first and second projections 116 and 117 are guided to the corresponding engaging concave parts 103a, 103b, 104b, and 105b. Accordingly, the urging member 13 is provided (see claims 8 through 11).

In the third embodiment as well as the first and second embodiments, the movable housing 13 shown in FIG. 13 may be rotated 90 degrees in only a single direction so that pose conversion is made.

For example, where the movable housing 3 is rotated 90 degrees only clockwise so that the pose conversion can be made, the second path part 105 except the engaging convex part 105a of the projection guide 102 and the engaging concave part 103b are omitted from the base plate 10 shown in FIG. 11(c).

On the other hand, in order for the movable housing 3 to be rotated 90 degrees only counterclockwise so that the pose conversion can be made, the first path part 104 except the engaging convex part 104a of the projection guide 102 and the engaging concave part 103a are omitted from the base plate 10 shown in FIG. 11(c).

In this embodiment as well as the first embodiment, in a case where the harness not illustrated is provided so as not to communicate from the base housing 4 side to the movable housing 3 side via an internal part space of the supporting base 2, it is preferable to use the connecting pin 12 having a hollow part communicating in an axial direction.

In the above-discussed embodiments, the slidable and rotational attaching unit 1 is used for the folding type mobile phone. However, the present invention is not limited to this. For example, the slidable and rotational attaching unit 1 can be used in a case where the supporting base 2 is slidably attached on the base housing 4 and the movable housing 3 is attached on the supporting base 2.

In addition, the attaching unit 1 can be used in a case where a desk top supporting base is provided separately from an input part or a personal computer main body and a part of the movable housing as an input part side housing is overlapped with the supporting base.

Although the invention has been described with respect to specific embodiment for a complete and clear disclosure, the appended claims are not to be thus limited but are to be construed as embodying all modifications and alternative constructions that may occur to one skilled in the art that fairly fall within the basic teachings herein set forth.

What is claimed is:

1. A slidable and rotationally attaching unit configured to slidably and rotatably attach a movable housing on a supporting base so that a part of the movable housing is overlapped with the supporting base, the slidable and rotational attaching unit comprising:

a base plate provided between the supporting base and the movable housing and attached to the supporting base;

a plate cam provided between the supporting base and the movable housing and attached to the movable housing;

a slide guide provided on a surface of the base plate facing the plate cam, the slide guide being formed by a slit or a groove along upper and lower directions in a standard pose that is a basic using state of the movable housing;

a guide pin provided on a surface of the base plate facing the plate cam, the guide pin being positioned on an extended line of a lower end of the slide guide; and a connecting pin slidably and rotatably engaged with the plate cam so that the connecting pin prevents the plate cam from coming off from the slide guide;

wherein a first concave part, a second concave part, and a third concave part are provided at an external circumference of the plate cam;

the guide pin is guided to the first concave part when the movable housing is in the standard pose;

the guide pin is guided to the second concave part when the movable housing is rotated 90 degrees in one direction from the standard pose; and the guide pin is guided to the third concave part when the movable housing is rotated 90 degrees in another direction from the standard pose.

2. The slidable and rotationally attaching unit as claimed in claim 1, wherein an urging member is provided so as to always urge the plate cam or the base plate in a direction where the guide pin is guided to one of the concave parts of the plate cam.

3. The slidable and rotationally attaching unit as claimed in claim 1, wherein the guide pin includes a roller.

4. The slidable and rotationally attaching unit as claimed in claim 1, wherein the connecting pin includes a hollow part communicating in an axial direction.

5. A slidable and rotationally attaching unit configured to slidably and rotatably attach a movable housing on a supporting base so that a part of the movable housing is overlapped with the supporting base, the slidable and rotational attaching unit comprising:

a base plate provided between the supporting base and the movable housing and attached to the movable housing;

a plate cam provided between the supporting base and the movable housing and attached to the supporting base;

a slide guide provided on a surface of the base plate facing the plate cam, the slide guide being formed by a slit or a groove along upper and lower directions in a standard pose that is a basic using state of the movable housing;

a guide pin provided on a surface of the base plate facing the plate cam, the guide pin being positioned on an extended line of a lower end of the slide guide; and a connecting pin slidably and rotatably engaged with the plate cam so that the connecting pin prevents the plate cam coming off from the slide guide;

an urging member configured to always urge the plate cam or the base plate in a direction where the guide pin is guided to one of the concave parts of the plate cam;

wherein a first concave part, a second concave part, and a third concave part are provided at an external circumference of the plate cam;

the guide pin is guided to the first concave part when the movable housing in the standard pose;

the guide pin is guided to the second concave part when the movable housing is rotated 90 degrees in one direction from the standard pose; and the guide pin is guided to the third concave part when the movable housing is rotated 90 degrees in another direction from the standard pose.

6. The slidable and rotationally attaching unit as claimed in claim 5, wherein a convex part is formed in a circumferential direction of the plate cam and between the first concave part and the second concave part, and the guide pin is in sliding contact with the convex part during rotation of the plate cam in the one direction; and another convex part is formed in a circumferential direction of the plate cam and between the first concave part and the third concave part, and the guide pin is in sliding contact with the other convex part during rotation of the plate cam in the other direction.

7. A slidable and rotationally attaching unit configured to slidably and rotatably attach a movable housing on a supporting base so that a part of the movable housing is overlapped with the supporting base, the slidable and rotational attaching unit comprising:

a base plate provided between the supporting base and the movable housing and attached to the supporting base;

a plate cam provided between the supporting base and the movable housing and attached to the movable housing;

a slide guide provided on a surface of the base plate facing the plate cam, the slide guide being formed by a slit or a groove along upper and lower directions in a standard pose that is a basic using state of the movable housing;

a projection path provided on the surface of the base plate facing the plate cam, the projection path being formed by a slit or a groove;

a connecting pin provided on a surface of the plate cam facing the base plate, the connecting pin being slidably and rotatably engaged with the plate cam so that the connecting pin prevents the plate cam coming off from the slide guide; and a first projection and a second projection provided on a surface of the plate cam facing the base plate, the first projection being positioned at one side of a lower part of the connecting pin in the standard pose of the movable housing, the second projection being positioned at another side of a lower part of the connecting pin in the standard pose of the movable housing;

wherein the projection path includes a first path part, a second path part, and a third path part;

the first path part extends at one side of the slide guide in upper and lower directions and the first projection passes through the first path part;

the second path part extends at another side of the slide guide in upper and lower directions and the second projection passes through the second path part;

the lower end of the first path part and the lower end of the second path part communicate so as to form a common path part where the first projection and the second projection pass;

an engaging convex part where the first projection is engaged is formed at the lower end of the first path part and another engaging convex part where the second projection is engaged is formed at the lower end of the second path part;

the engaging convex parts face a center line in the width direction of the slide guide in the standard pose of the movable housing;

a first engaging concave part is formed at an upper end part of the first path part and the first projection is guided to the first engaging concave part when the movable housing is rotated 90 degrees in one direction from the standard pose;

a second engaging concave part is formed at an upper end part of the second path part and the second projection is guided to the second engaging concave part when the movable housing is rotated 90 degrees in another direction from the standard pose;

a third engaging concave part is formed at a lower part of an end part of a side of the common path part communicating with the first path part and the second projection is guided to the third engaging concave part when the movable housing is rotated 90 degrees in the one direction from the standard pose of the movable housing; and a fourth engaging concave part is formed at a lower part of an end part of a side of the common path part communicating with the second path part and the first projection is guided to the fourth engaging concave part when the movable housing is rotated 90 degrees in the other direction from the standard pose of the movable housing.

8. The slidable and rotationally attaching unit as claimed in claim 7,
wherein an urging member is provided so as to always urge the plate cam or the base plate in a direction where the connecting pin slides downward.

9. The slidable and rotationally attaching unit as claimed in claim 7,
wherein, in the standard pose of the movable housing, the first projection and the second projection are positioned symmetrically with respect to a vertical line passing through the center of the connecting pin.

10. The slidable and rotationally attaching unit as claimed in claim 7,
wherein the common path part has a curved configuration where a convex part faces the slide guide; and
a concave part configured to guide the first projection and the second projection when the first projection and the second projection pass through the common path part, is formed between both ends of the common path part, and becomes hollow in a direction opposite to the curved configuration of the common path part.

11. A slidable and rotationally attaching unit configured to slidably and rotatably attach a movable housing on a supporting base so that a part of the movable housing is overlapped with the supporting base, the slidable and rotational attaching unit comprising:
a base plate provided between the supporting base and the movable housing and attached to the movable housing;
a plate cam provided between the supporting base and the movable housing and attached to the supporting base;
a slide guide provided on a surface of the base plate facing the plate cam, the slide guide being formed by a slit or a groove along upper and lower direction in a standard pose that is a basic using state of the movable housing;
a projection path provided on the surface of the base plate facing the plate cam, the projection path being formed by a slit or a groove;
a connecting pin provided on a surface of the plate cam facing the base plate, the connecting pin being slidably and rotatably engaged with the plate cam so that the connecting pin prevents the plate cam coming off from the slide guide; and a first projection and a second projection provided on a surface of the plate cam facing the base plate, the first projection being positioned at one side of an upper part of the connecting pin in the standard pose of the movable housing, the second projection being positioned at another side of an upper part of the connecting pin in the standard pose of the movable housing;

wherein the projection path includes a first path part, a second path part, and a third path part;

the first path part extends at one side of the slide guide in upper and lower directions and the first projection passes through the first path part;

the second path part extends at another side of the slide guide in upper and lower directions and the second projection passes through the second path part;

the lower end of the first path part and the lower end of the second path part communicate so as to form a common path part where the first projection and the second projection pass;

an engaging part is provided so that the cam or the base plate is always urged in a direction where the connecting pin slides upward;

an engaging convex part where the first projection is engaged is formed at the upper end of the first path part and another engaging convex part where the second projection is engaged is formed at the upper end of the second path part;

the engaging convex parts face a center line in the width direction of the slide guide in the standard pose of the movable housing;

a first engaging concave part is formed at a lower end part of the first path part and the first projection is guided to the first engaging concave part when the movable housing is rotated 90 degrees in one direction from the standard pose;

a second engaging concave part is formed at a lower end part of the second path part and the second projection is guided to the second engaging concave part when the movable housing is rotated 90 degrees in another direction from the standard pose;

a third engaging concave part is formed at an upper part of an end part of a side of the common path part communicating with the first path part and the second projection is guided to the third engaging concave part when the movable housing is rotated 90 degrees in the one direction from the standard pose of the movable housing; and a fourth engaging concave part is formed at an upper part of an end part of a side of the common path part communicating with the second path part and the first projection is guided to the fourth engaging concave part when the movable housing is rotated 90 degrees in the other direction from the standard pose of the movable housing.

12. An electronic device, comprising:
the slidable and rotational attaching unit as claimed in claim 1,
wherein the supporting base is rotatably attached to the base housing having an input part by a hinge; and
the movable housing has a display part.

13. The electronic device as claimed in claim 12,
wherein the base housing is a microphone side housing of a mobile phone; and
the movable housing is an earphone side housing of the mobile phone.

* * * * *